(12) United States Patent
Mizrachi et al.

(10) Patent No.: US 8,150,935 B2
(45) Date of Patent: *Apr. 3, 2012

(54) ISCSI RECEIVER IMPLEMENTATION

(75) Inventors: Shay Mizrachi, Hod-Hasharon (IL); Rafi Shalom, Ramat Gan (IL); Ron Grinfeld, Ramat Gan (IL)

(73) Assignee: Broadcom Corporation, Irvine, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 12/619,833

(22) Filed: Nov. 17, 2009

(65) Prior Publication Data

US 2010/0241725 A1 Sep. 23, 2010

Related U.S. Application Data

(63) Continuation of application No. 10/236,768, filed on Sep. 6, 2002, now Pat. No. 7,620,692.

(60) Provisional application No. 60/317,620, filed on Sep. 6, 2001.

(51) Int. Cl.
G06F 15/167 (2006.01)

(52) U.S. Cl. ........................................ 709/212; 709/230

(58) Field of Classification Search .................. 709/212, 709/246, 230
See application file for complete search history.

(56) References Cited

U.S. PATENT DOCUMENTS

| | | | |
|---|---|---|---|
| 5,440,545 A | 8/1995 | Buchholz et al. | |
| 5,493,667 A | 2/1996 | Huck et al. | |
| 5,809,527 A | 9/1998 | Cooper et al. | |
| 5,809,543 A | 9/1998 | Byers et al. | |
| 5,963,963 A | 10/1999 | Schmuck et al. | |
| 5,970,391 A | 10/1999 | Eaton et al. | |
| 6,034,963 A * | 3/2000 | Minami et al. | 370/401 |
| 6,438,655 B1 | 8/2002 | Nicol et al. | |
| 6,601,143 B1 | 7/2003 | Lamparter | |
| 6,631,130 B1 | 10/2003 | Roy et al. | |
| 6,643,710 B1 | 11/2003 | Thome et al. | |
| 6,654,811 B1 | 11/2003 | Chaskar et al. | |
| 6,742,045 B1 | 5/2004 | Albert et al. | |
| 6,771,646 B1 | 8/2004 | Sarkissian et al. | |
| 6,795,866 B1 | 9/2004 | Mankude et al. | |
| 7,289,499 B1 * | 10/2007 | Chinn et al. | 370/389 |
| 7,583,681 B2 * | 9/2009 | Green | 370/401 |
| 2003/0093567 A1 * | 5/2003 | Lolayekar et al. | 709/246 |

OTHER PUBLICATIONS

Satran et al. draft-ietf-ips-iscsi-07.txt. Jul. 20, 2001. pp. 1-189.*
Cisco Systems. iSCSI Protocols Concepts and Implementations. May 2001. pp. 1-12.*

(Continued)

*Primary Examiner* — John MacIlwinen
(74) *Attorney, Agent, or Firm* — McAndrews, Held & Malloy, Ltd.

(57) ABSTRACT

A method for communication is disclosed and may include, in a network interface device, parsing a portion of a TCP segment into one or more portions of Internet Small Computer Systems Interface (iSCSI) Protocol Data Units (PDUs). A header and/or a payload for one or more of the parsed iSCSI PDUs may be recovered. Concurrent with parsing of a remaining portion of the TCP segment to recover a remaining portion of PDUs, the recovered header may be evaluated and/or the recovered payload may be routed external to the network interface device for processing. The evaluating and the routing may occur independently of the parsing within the network interface device. Respective separate physical processors may be used for the parsing and the recovering. The respective separate processors for recovering may be used for the evaluating and the routing.

40 Claims, 10 Drawing Sheets

OTHER PUBLICATIONS

Postel, RFC 793 of the U.S. DARPA, Transmission Control Protocol: DARPA Internet Program Protocol Specification, 1981.

OSI (http://searchnetworking.techtarget.com/sDefinition/0,sid7_gci212725,00.htm), 2001.

Marjorie Krueger, et al., iSCSI Requirements and Design Considerations (http://ietf.org/internet-drafts/draft-ietf-ips-iscsi-reqmts-05.txt), 2001.

Charles M. Kozierok, Overview and History of the SCSI Interface, PC Guide (http://www.pcguide.com/ref/hdd/if/scsi/over-c.html), 2002.

Julian Satran, et al., The Internet-Draft titled "iSCSI" (http://ietf.org/internet-drafts/draft-ietf-ips-iscsi-13.txt), Jun. 2002.

Office Action for U.S. Appl. No. 10/236,742 mailed on Nov. 4, 2005.

* cited by examiner

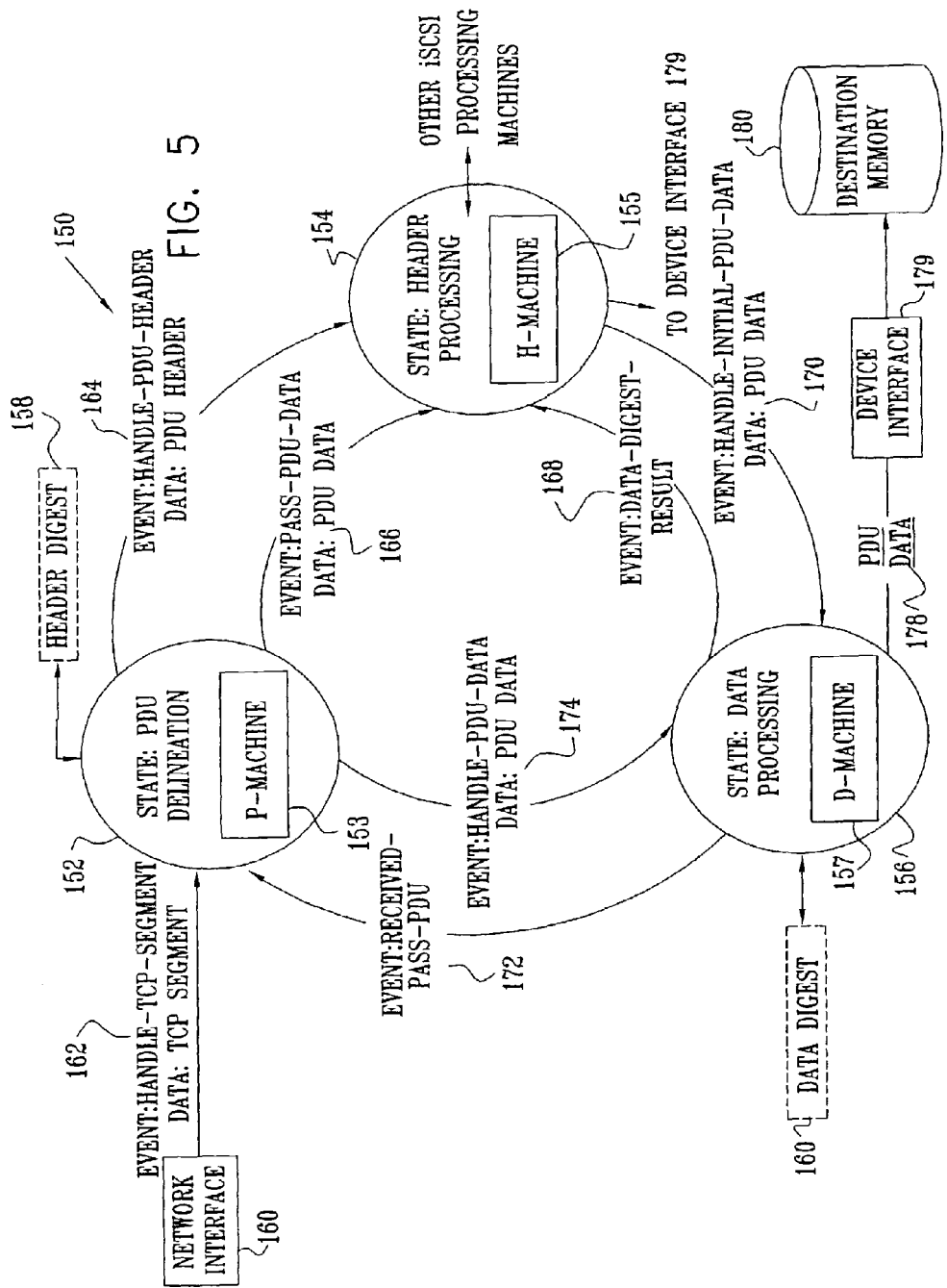

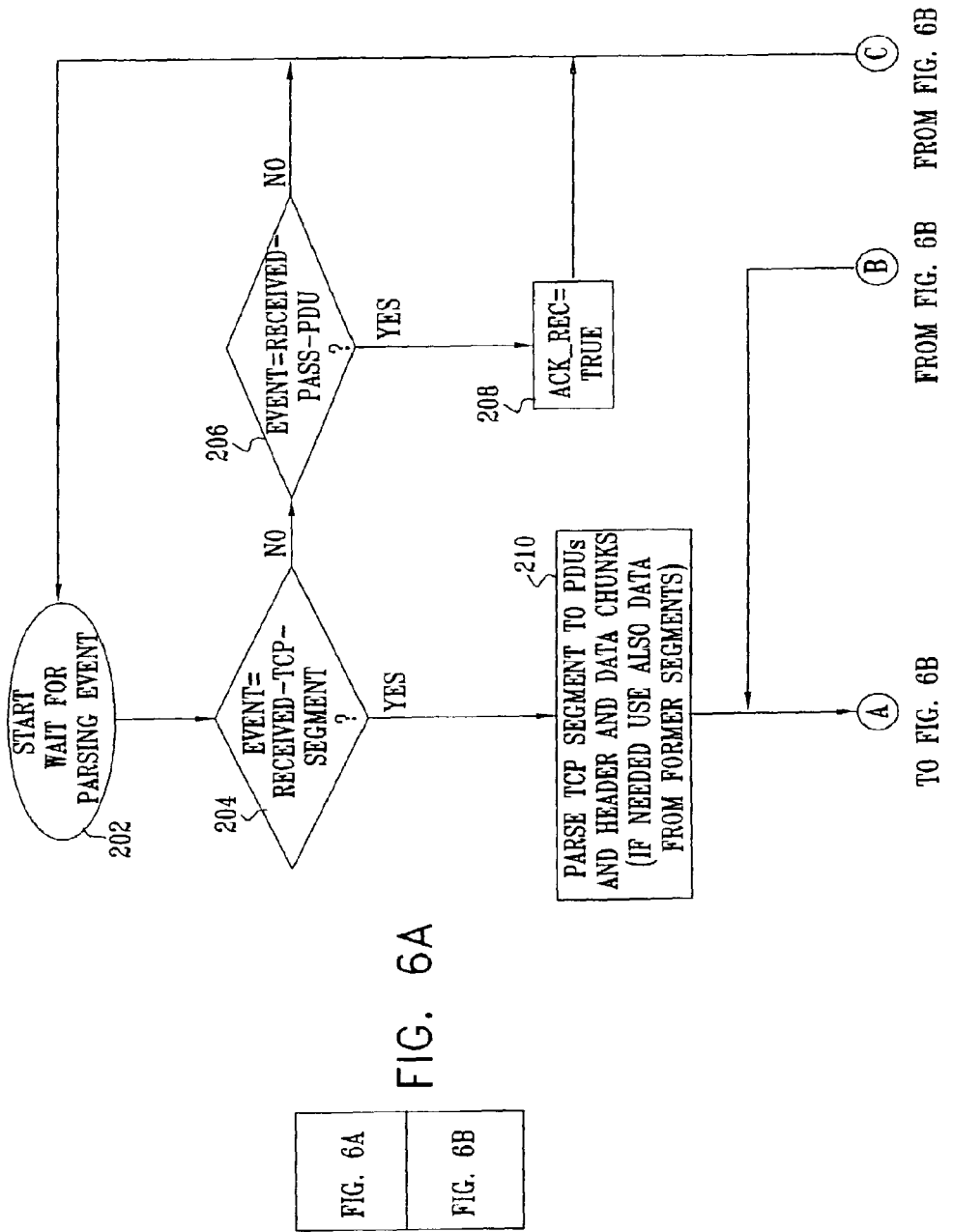

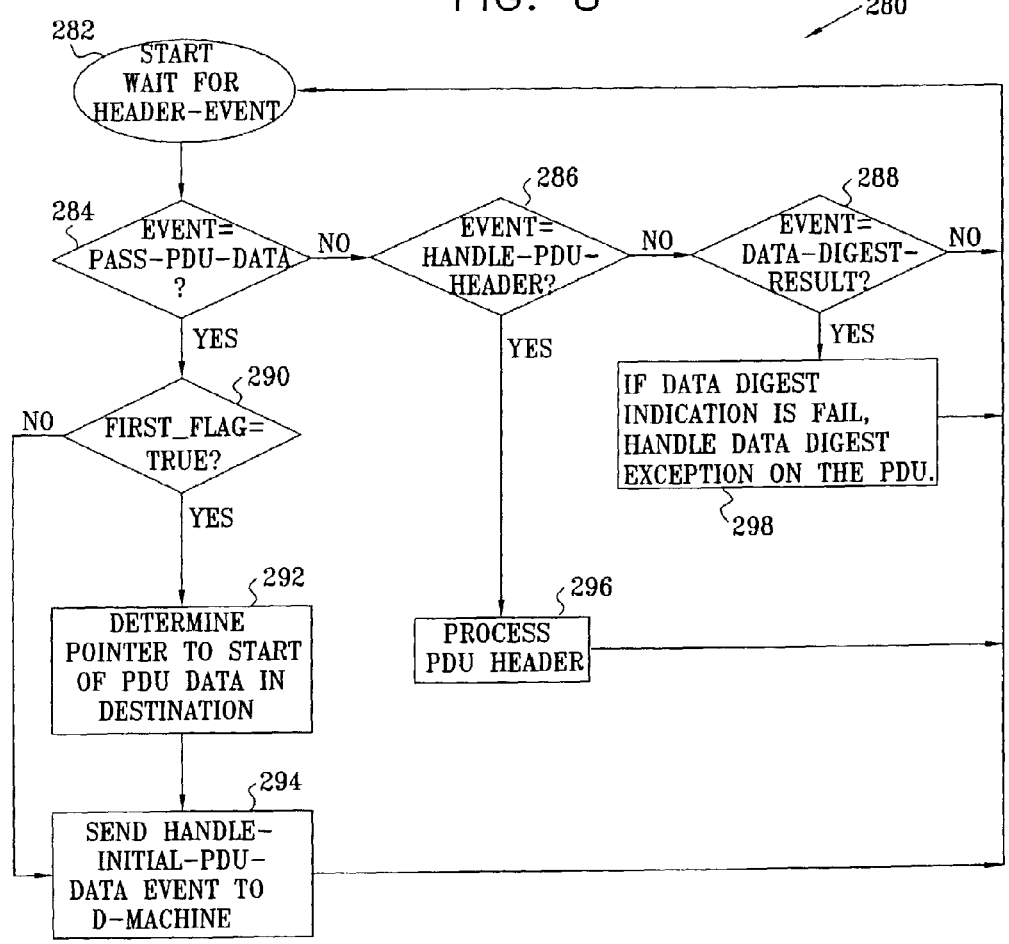

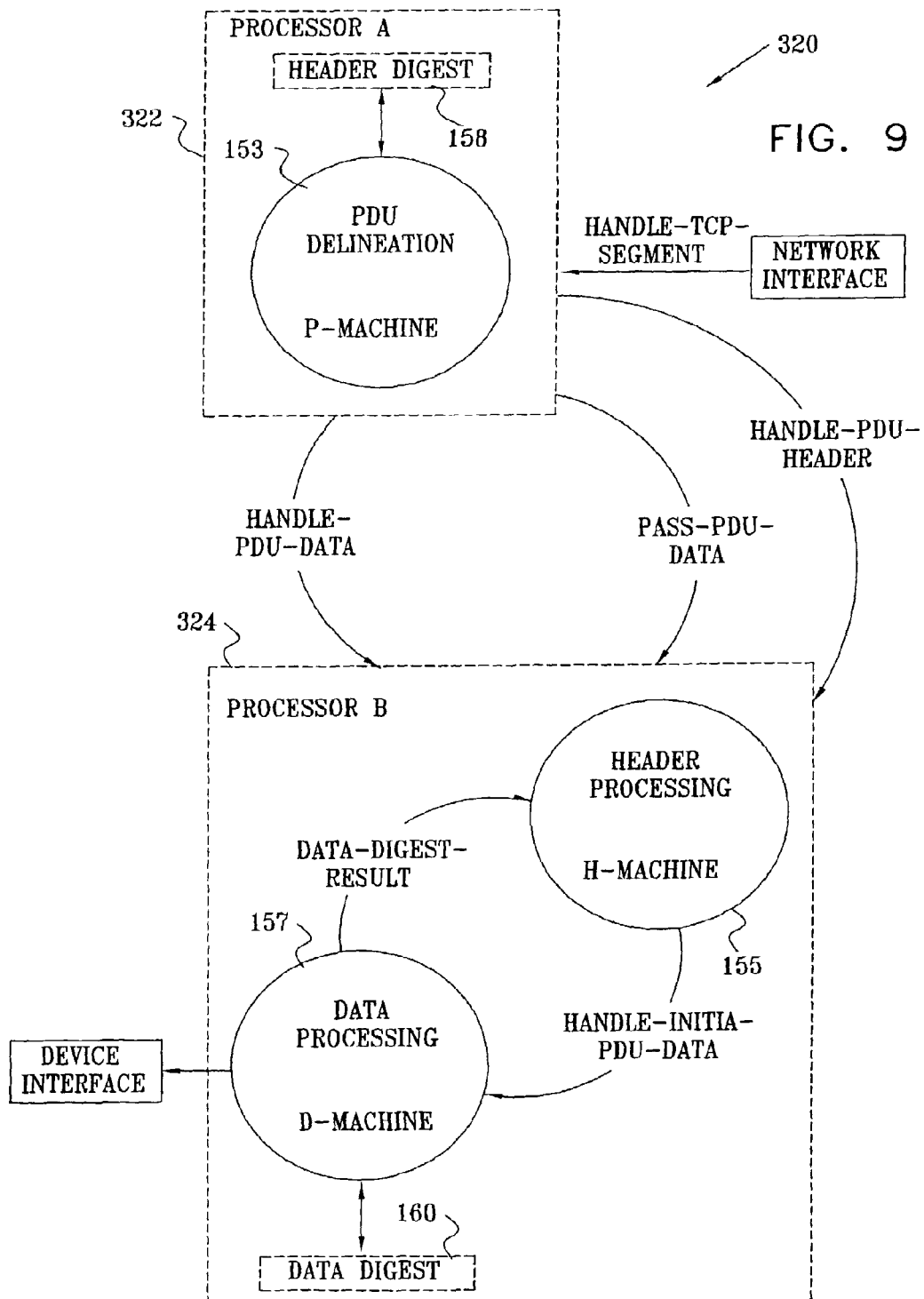

ISCSI RECEIVER IMPLEMENTATION

CROSS-REFERENCE TO RELATED APPLICATIONS

This application is a continuation of U.S. application Ser. No. 10/236,768 filed Sep. 6, 2002, which in turn makes reference to, claims priority to and claims the benefit of: U.S. Provisional Patent Application Ser. No. 60/317,620 filed on Sep. 6, 2001.

FIELD OF THE INVENTION

The present invention relates generally to network communications, and specifically to optimizing receiving SCSI traffic using an iSCSI protocol over TCP/IP networks.

BACKGROUND OF THE INVENTION

The need for fast access to massive amounts of shared data in today's networked computing environment has given rise to a data storage and retrieval technology called Storage Area Networks (SANs). Increasingly, SAN deployments depend on existing Transmission Control Protocol/Internet Protocol (TCP/IP) networks via an emerging standard Internet Small Computer Systems Interface (iSCSI) protocol. The Internet Engineering Task Force (IETF) Internet Protocol Storage Working Group has proposed a standard for iSCSI, which was submitted in June, 2002 as an Internet-Draft on the standards track of the IETF. The Internet-Draft, titled "iSCSI" by Julian Satran, et al., can be found at http://ietf.org/internet-drafts/draft-ietf-ips-iscsi-13.txt, and is incorporated herein by reference, and is herein referred to as the IETF iSCSI Internet-Draft. Dependence on existing TCP/IP networks creates a need to streamline communication of SCSI commands over TCP/IP networks, in order to achieve maximal performance levels.

In a traditional approach to data storage, called Direct Attached Storage (DAS), storage devices are linked to a server with a fixed, dedicated connection. Only one server can normally access data on a particular disk, via a local bus, commonly using a Small Computer Systems Interface (SCSI) protocol. The original SCSI protocol was standardized in 1986 by the American National Standards Institute (ANSI) as X3.131-1986. The current evolving SCSI standard is described in a document titled "SCSI Architecture Model-2 (SAM-2)," produced by T10, Technical Committee of the National Committee on Information Technology Standards, which may be found on the T10 Internet site at ftp://ftp.t10.org/t10/drafts/sam2, and which is incorporated herein by reference. DAS suffers from a number of limitations, for example, the SCSI protocol limits the length of a bus connecting to a device to about 6 meters. Additional limitations and drawbacks include upper limits on speed, and number of attached storage devices, limited scalability and reliability, and limitations of exclusive ownership of attached storage. These limitations are addressed by SANs.

FIG. 1 is a schematic block diagram depicting an architecture 10 for a Storage Area Network (SAN), as is known in the art. Architecture 10 comprises one or more users 20 operating one or more applications on one or more hardware platforms. The one or more applications generate requests for retrieval or storage of data. These requests are transferred via a LAN 26 to a server. In architecture 10, three different servers are present: a mail server 28, an application server 30, and a database server 32. Each server is designed to handle user requests of a specified type. For example, database server 32 is designed to handle requests to retrieve data from a centralized database. Each server communicates with a SAN 40 to satisfy its requests. Mail server 28, application server 30, and database server 32 generate commands to storage devices 42, 44, 46, and 48 in a format comprehensible to the devices, typically using the SCSI protocol. Storage devices 42, 44, 46, and 48 are also herein termed storage devices A, B, C, and D respectively. The commands are routed through SAN 40 via hubs and switches 34 and 36, which provide one or more connection ports for the storage devices. Storage devices A, B, C, and D comprise SCSI controllers which carry out the actions specified in the SCSI commands. A variety of storage devices and media are known in the art, including redundant arrays of independent disks (RAID), tapes, and optical storage arrays.

SANs handle communication between storage devices and storage clients. As noted above, the SCSI protocol acts as a common, standard interface to storage devices. Devices using the SCSI protocol include input/output (I/O) devices, hard drives, tape drives, CD and DVD drives, printers, and scanners. As well as defining hardware characteristics of an SCSI bus, the SCSI protocol specifies the formats and rules governing commands and responses communicated between storage devices, called "targets" in SCSI terminology, and storage clients, known as "initiators."

In an article entitled "Overview and History of the SCSI Interface" by Charles M. Kozierok, published in the PC Guide which can be found at http://www.pcguide.com/ref/hdd/if/scsi/over-c.html, and which is incorporated herein by reference, the author emphasizes the general nature of the SCSI interface: "It's important to remember that SCSI is, at its heart, a system interface, as the name suggests. It was first developed for hard disks, is still used most for hard disks . . . . For those reasons, SCSI is sometimes thought of as a hard disk interface . . . . However, SCSI is not an interface tied specifically to hard disks. Any type of device can be present on the bus . . . ."

A SAN containing SCSI-based storage devices has at its core the task of SCSI transport: facilitating the transmission of SCSI commands and responses between targets and initiators. The first technology released for SCSI transport in the SAN environment was Fibre Channel, using special-purpose hardware, optimized for storage and other high-speed applications. The high costs associated with Fibre Channel installation, management, maintenance, and interoperability, together with the availability of Gigabit Ethernet and 10-Gigabit Ethernet, which are not limited to Fibre Channel fabrics, inter alia gave rise to the iSCSI protocol. Gigabit Ethernet and 10-Gigabit Ethernet provide data rates of one gigabit per second and 10 gigabits per second respectively, based on Ethernet frame formats and protocols, for example, the IEEE 802.3(Z) Ethernet protocol, issued by the Institute of Electrical and Electronics Engineers, Inc., New Jersey.

The iSCSI protocol is a transport protocol for SCSI commands over TCP networks. TCP is described by Postel in Request For Comments (RFC) 793 of the U.S. Defense Advanced Research Projects Agency (DARPA), entitled "Transmission Control Protocol: DARPA Internet Program Protocol Specification" (1981), which is incorporated herein by reference. The IETF iSCSI Internet-Draft document defines methods for encapsulating SCSI command descriptor blocks (CDBs) and responses into iSCSI messages, known as Protocol Data Units (PDUs), controlling flow, establishing iSCSI sessions, identifying PDUs in the TCP stream, mapping a session to multiple connections, and adding correction code on top of the TCP protocol, among other protocol elements.

A related, informational Internet-Draft by the IP Storage Working Group entitled "iSCSI Requirements and Design Considerations" by Marjorie Krueger, et al. can be found at http://ietf.org/internet-drafts/draft-ietf-ips-iscsi-regmts-05.txt, and is incorporated herein by reference. Krueger, et al. describe the charter of the IP Storage Working Group as "developing comprehensive technology to transport block storage data over IP protocols . . . . The initial version of the iSCSI protocol will define a mapping of SCSI transport protocol over TCP/IP so that SCSI storage controllers (principally disk and tape arrays and libraries) can be attached to IP networks, notably Gigabit Ethernet (GbE) and 10 Gigabit Ethernet (10 GbE)."

The benefits to SAN implementations based on iSCSI derive primarily from the large body of experience, knowledge, tools, and equipment that exist in the industry in both the fields of SCSI and TCP/IP. As Krueger, et al. go on to note, the IP Storage Working Group "has chosen to focus the first version of the protocol to work with the existing SCSI architecture and commands, and the existing TCP/IP transport layer. Both these protocols are widely deployed and well understood. The thought is that using these mature protocols will entail a minimum of new invention, the most rapid possible adoption, and the greatest compatibility with Internet architecture, protocols, and equipment."

The standard layered architectural model for communications between two users in a network is known as the International Standards Organization's Open Systems Interconnection (ISO/OSI) and is specified in standard ISO/IEC 7498-1:1994, "Open Systems Interconnection—Basic Reference Model: The Basic Model." An overview of the OSI reference model is provided in an article entitled "OSI," which can be found at the Internet site http://searchnetworking.techtarget.com/sDefinition/0,,sid7_gci212725,00.html, and which is incorporated herein by reference.

The OSI reference model (OSI-RM) is well known to those skilled in the art, and describes layers of functions which are comprised in network communications. A layer comprises one or more protocols which work together to provide a set of network functions, with each intermediate protocol layer using the layer below it to provide services to the layer above it. The hierarchical aggregation of these protocols is known as a protocol stack.

Reference is now made to FIG. 2, which is a schematic block diagram depicting a five-layer protocol stack 60 used in iSCSI, as is known in the art. Protocol stack 60 is a set of protocol layers required to transfer SCSI commands over a TCP/IP network. Each layer may be implemented in software or hardware, or a combination of both. A SCSI highest layer 62 comprises formulating and interpreting SCSI CDBs and responses 72, and is typically implemented in an operating system or SCSI controller. CDBs and responses 72 pass to an iSCSI layer 64 responsible for implementing the iSCSI protocol, and create iSCSI Protocol Data Units (PDUs) 73, by adding to the SCSI CDBs and responses. Additions may comprise headers and other information needed to facilitate transport in a network, e.g., a length of the iSCSI PDU.

Optionally, PDUs contain a header digest and data digest. A digest, as is known in the art, is a string of digits calculated by a function such as a one-way hash formula applied to a stream of data, and is used to verify data integrity. A digest is calculated, for example, by a transmitter and appended to a transmission. A receiver re-calculates the digest based on the data received, and compares it to the received digest. If the receiver-calculated digest does not match the transmitted digest, intentional or unintentional corruption of the transmitted data has occurred. Use of digests is optional and is determined by negotiations between an initiator and target during a login process.

PDUs 73 are transferred to a TCP layer 66, which implements functions of the OSI-RM Transport Layer, e.g., error checking and flow control, and generates one or more TCP segments 74 from PDUs 73. An IP layer 68 performs the functions of The OSI-RM Network Layer, e.g., routing and forwarding of packets in a network, producing IP packets 75. Finally, a lowest level Ethernet layer 70 implements the OSI-RM Data-Link Layer, performing synchronization for the physical transmission and handling low-level communications functions. Ethernet layer 70 transmits and receives data via a physical transmission medium (not shown in FIG. 2). Protocol stack 60 depicts transmitting, when viewed from SCSI layer 60 downward, and receiving, when viewed from Ethernet layer 70 upward.

FIG. 3 is a schematic block diagram depicting a flow 80 of SCSI transactions between an initiator and a target in an iSCSI architecture, as is known in the art. Flow 80 uses a protocol stack similar to that depicted in FIG. 2. Transmission begins with a user 82 initiating a storage request. User 82 performs substantially the same functions as user 20 in FIG. 1. The storage request may specify retrieval or storage of data, and is passed to a server 84 comprising a SCSI controller 86, an iSCSI transmit/receive device 87, and a TCP/IP protocol device 88. Server 84 corresponds to one of mail server 28, application server 30, or database server 32 described in reference to FIG. 1. The iSCSI protocol stack presented in FIG. 2 is implemented in iSCSI transmit/receive device 87, which may be implemented in software (e.g., a part of a computer operating system), hardware (e.g., a dedicated chip or board), or a combination of software and hardware, together with physical links 91 and 93.

SCSI controller 86 formulates the storage request in terms of one or more SCSI CDBs, substantially the same as CDBs 72 in FIG. 2. iSCSI transmit/receive device 87 constructs iSCSI PDUs, substantially the same as PDUs 73 in FIG. 2. TCP/IP protocol device 88 transforms the iSCSI PDUs into TCP segments, then into IP packets 92 (and also adds an Ethernet layer similar to layer 70), corresponding to TCP segments 74 and IP packets 75 in FIG. 2, respectively. IP packets 92 are transmitted in the direction of a target storage device 104 via physical links 91 and 93 and a TCP/IP network 90, which supports an Ethernet protocol corresponding to the Ethernet layer added. IP packets 92 are typically received by a storage server 100, which comprises a TCP/IP protocol device 96, an iSCSI receive/transmit device 98 and a SCSI controller 102, which are substantially similar in implementation to TCP/IP protocol device 88, iSCSI receive/transmit device 87 and SCSI controller 86.

IP packets 92 are deciphered into TCP segments by TCP/IP protocol stack 96, and the resulting TCP segments are processed by iSCSI receive/transmit 98, which reconstructs iSCSI PDUs and handles iSCSI flow control. The SCSI commands are extracted from the resulting iSCSI PDUs, and passed to SCSI controller 102, which causes the execution of the commands on a storage device 104.

Data returned from storage device 104, called a SCSI response, flows in a reverse order, from storage device 104, through the components of storage server 100, via IP network 90 to application server 84, and finally to user 82. It will be understood that FIG. 3 illustrates a sample configuration of an iSCSI architecture; numerous variations on this sample configuration are known in the art.

It will be clear from an examination of FIG. 3 that implementation of the iSCSI protocol comprises implementing a transmitter and a receiver function for both user 82 as an initiator of SCSI commands and device 104 as a target. As well, it is noted that communications between user 82 and device 104 occur over one or more TCP connections, as indicated schematically by arrows 91, 93, 95, and 97. A collection of TCP connections comprising communications between a specific initiator and a specific target is called a session, and is uniquely identified by a session ID number.

FIG. 4 is a schematic block diagram illustrating a mapping of TCP segments to iSCSI PDUs, assumed to be independent of each other, as is known in the art. FIG. 4 presents a stream of data 120, transmitted from server 84, which comprises three iSCSI PDUs: an iSCSI PDU 1, an iSCSI PDU 2, and an iSCSI PDU 3. Each iSCSI PDU comprises a header and, optionally, payload data, depending on the type of SCSI CDB or response contained in the PDU. Thus, iSCSI PDU 1 comprises Header 1 and Data 1, while iSCSI PDU 2 comprises only Header 2. To accomplish transmission over network 90 (FIG. 3), TCP/IP protocol device 88 partitions the three PDUs into five different TCP segments. Thus, TCP segment 1 comprises all of PDU 1's header and a portion 126 of its payload. TCP segment 2 comprises a further portion 128 of PDU 1's payload. TCP segment 3 comprises a last portion 130 of PDU 1's payload data, all of PDU 2's header (132), and a portion 134 of PDU 3's header. The IETF iSCSI Internet-Draft proposes mechanisms for delineating PDUs, i.e., determining beginning and ending boundaries for PDUs.

Since speed and throughput are prime factors in any iSCSI implementation, many iSCSI receiver implementations comprise embedded logic on an integrated circuit, located, for example, in iSCSI receive/transmit 98 (FIG. 3). Furthermore, high line speeds of one Gbit/s and 10 Gb/s require multiple processors in order to avoid bottlenecks.

Implementing iSCSI across multiple processors raises numerous questions and problems. For example, generating a complete iSCSI implementation on each processor results in significant duplication, and waste of integrated circuit resources. Deciding how to allocate incoming TOP segments among multiple processors raises additional problems. For example, if segments are allocated according to load balancing considerations only, race conditions could result from messages from a single connection being processed in different processors which access a shared memory. Thus, additional logic and data would be required to synchronize access from the different processors. Alternatively, allocating messages according to connection, i.e., all messages from a given connection A are allocated to processor A, could cause great inefficiencies in the case of a dominant connection using most of the line capacity. There is thus a need for an improved method for multiple processors to support iSCSI.

SUMMARY OF THE INVENTION

It is an object of some aspects of the present invention to provide a method and apparatus for partitioning tasks of an Internet Small Computer Systems Interface (iSCSI) receiver.

It is a further object of some aspects of the present invention to provide a method and apparatus for partitioning tasks of an iSCSI receiver among multiple processors.

In preferred embodiments of the present invention, a method and an apparatus for implementing an iSCSI receiver is defined. The receiver uses an architecture suited for implementation by more than one processor. The method comprises partitioning an iSCSI receiver algorithm into three logical event-driven tasks, each embodied by a different logical machine: a parsing, Protocol Data Unit (PDU) delineation machine, called a P-machine; a data processing machine, called a D-machine; and a header processing machine, called an H-machine. By thus partitioning the iSCSI receiver algorithm, partial PDUs can be processed immediately, without waiting for an entire PDU to be assembled. The three machines may be allocated among a plurality of physical processors, so that multiple incoming iSCSI messages can be processed in parallel, thereby increasing speed and throughput.

The iSCSI receiver receives a Transmission Control Protocol (TCP) segment via a network interface, which may contain a part of an iSCSI PDU, a whole PDU, or multiple PDUs. Since SCSI transfers typically involve transfer of large quantities of data, it is common for a single PDU to comprise a lengthy data section, which is split into a plurality of TCP segments. In preferred embodiments of the present invention, the TCP segment is parsed by the P-machine to determine starting and ending boundaries of a header and optional data payload of the PDU, the iSCSI header is processed by the H-machine, and any data contained in the TCP segment is processed by the D-machine. Received data, even if it comprises only a fragment of the PDU's complete data payload, is sent directly to its intended destination via a device interface, without intermediate buffering In some preferred embodiments, additional data digest and header digest processing are performed, dependent on the D-machine and H-machine respectively, preferably as separate tasks.

Unlike other methods known in the art for iSCSI receiver implementation, in preferred embodiments of the present invention:

Incoming TCP segments are immediately parsed into whole or partial PDUs, which in turn are processed directly, without waiting to assemble a complete PDU;

The iSCSI receiver processing is partitioned in such a way so as to enhance efficiency of a multi-processor implementation by minimizing inter-processor communication and shared parameters, thereby minimizing overhead resulting from synchronization requirements;

TCP segments are processed directly and data is sent to its destination with no intermediate buffering, improving speed and minimizing resource use;

Optimal use of multiple processors is facilitated, by allocating physical processors according to logical tasks to be performed on a TCP segment, rather than on the basis of connection or load balancing; and Duplication of logic among multiple processors is avoided, conserving integrated circuit resources.

There is therefore provided, according to a preferred embodiment of the present invention, apparatus for receiving a sequence of Transmission Control Protocol (TCP) segments, including:

a parsing machine which is adapted to parse at least one TCP segment so as to recover an Internet Small Computer Systems Interface Protocol Data Unit (iSCSI PDU), the PDU including a header and at least part of a payload; and at least one analysis machine which is adapted to receive and evaluate the header and to receive and route the at least part of the payload for the iSCSI PDU, the parsing machine and the at least one analysis machine operating substantially autonomously.

Preferably, the TCP segments are generated by at least one of an iSCSI initiator and an iSCSI target.

Preferably, the parsing machine and the at least one analysis machine are implemented using at least two separate physical processors.

Preferably, the header is included in a plurality of incoming TCP segments.

Further preferably, the payload is included in a plurality of incoming TCP segments.

The apparatus preferably further includes a header-digest machine which is adapted to generate a computed-header-digest responsive to the header, the computed-header-digest being compared by the parsing machine to a header-segment-header-digest included in the header so as to verify error-free receipt of the header for the iSCSI PDU, the header-digest machine, the parsing machine, and the at least one analysis machine operating substantially autonomously.

The apparatus preferably further includes a data-digest machine which is adapted to generate a computed-data-digest responsive to the payload, the computed-data-digest being compared by the at least one analysis machine to a header-segment-data-digest included in the header so as to verify error-free receipt of the payload of the iSCSI PDU, the data-digest machine, the parsing machine, and the at least one analysis machine operating substantially autonomously.

Preferably, the parsing machine is adapted to generate a computed-header-digest, and to compare the computed-header-digest to a header-segment-header-digest included in the header for the iSCSI PDU so as to verify error-free receipt of the header.

Preferably, the parsing machine is adapted to receive and route at least one parsing event and to execute parsing actions, responsive to the at least one parsing event.

Further preferably, the at least one parsing event includes at least one of a receive-TCP-segment event indicative of receipt of the TCP segment and a received-pass-PDU event indicative of acknowledgement by the at least one analysis machine of receipt of an initial part of the payload.

Further preferably, the parsing actions include:
determining a starting header boundary and an ending header boundary so as to delineate the header;
recovering the header from the at least one TCP segment;
determining a starting payload boundary and an ending payload boundary so as to delineate the at least part of the payload;
conveying the header and the at least part of the payload to the at least one analysis machine;
identifying the at least part of the payload as an initial part of the payload for the iSCSI PDU; and
receiving an acknowledgment of receipt of the initial part of the payload from the at least one analysis machine.

Preferably, the at least one analysis machine includes:
a header-processing machine which evaluates the header; and
a data-processing machine which routes the at least part of the payload, the header-processing machine and the data-processing machine operating substantially autonomously.

Preferably, the header-processing machine is adapted to receive and route at least one header event, and to execute header processing actions, responsive to the at least one header event.

Further preferably, the at least one header event includes at least one of a pass-PDU-data event indicative of receipt by the parsing machine of an initial part of the payload of the iSCSI PDU, a handle-PDU-header event indicative of receipt by the parsing machine of the header, and a data-digest-result event indicative of completion of a data digest calculation by the data-processing machine.

Further preferably, the header processing actions include:
identifying the at least part of the payload as an initial part of the payload for the iSCSI PDU;
determining a disposition of the initial part of the payload by computing a destination address in a system memory for the initial part of the payload;

recovering iSCSI information from the header; and
executing iSCSI actions responsive to the iSCSI information.

Preferably, the data-processing machine is adapted to generate a computed-data-digest, and to compare the computed-data-digest to a header-segment-data-digest included in the header of the iSCSI PDU so as to verify error-free receipt of the payload.

Preferably, the data-processing machine is adapted to receive and route at least one data event and to execute data processing actions responsive to the at least one data event.

Further preferably, the data processing actions include computing a data digest responsive to the payload so as to verify error-free receipt of the payload for the iSCSI PDU.

Further preferably, the at least one data event includes at least one of a handle-initial-PDU-data event indicative of receipt of an initial part of the payload, and a handle-PDU-data event indicative of receipt of a subsequent part of the payload.

Further preferably, the data processing actions include:
transferring data included in the at least part of the payload to a system memory;
determining that the at least part of the payload is an initial part of the payload for the iSCSI PDU; and
acknowledging receipt of the initial part of the payload.

Further preferably, transferring the data includes:
calculating a destination address in a system memory for the data, responsive to a disposition of the payload;
moving a received-quantity-of-data from the at least part of the payload to the destination address;
determining an expected-quantity-of-data for the iSCSI PDU; and
evaluating a state of completion for the iSCSI PDU responsive to a comparison of the received-quantity-of-data to the expected-quantity-of-data.

There is further provided, according to a preferred embodiment of the present invention, network interface apparatus, including:
a device interface, adapted to communicate with a computing device, which is adapted to receive and execute Small Computer Systems Interface (SCSI) operations and has a system memory;
a network interface, adapted to receive from a network a sequence of Transmission Control Protocol (TCP) segments that contains an Internet Small Computer Systems Interface Protocol Data Unit (iSCSI PDU), the iSCSI PDU including a header and a payload; and
an analysis machine, adapted to parse at least one TCP segment so as to recover the header and at least part of the payload of the iSCSI PDU, to evaluate the header so as to determine a disposition of the payload, and to route the at least part of the payload to the system memory for processing by the computing device responsive to the disposition, independent of recovering a remainder of the payload beyond the recovered at least part of the payload.

Preferably, the TCP segments are generated by at least one of an iSCSI initiator and an iSCSI target.

Preferably, the analysis machine is implemented using at least two separate physical processors.

Preferably, the header is included in a plurality of incoming TCP segments.

Preferably, the payload is included in a plurality of incoming TCP segments.

The apparatus preferably further includes a header-digest machine which is adapted to generate a computed-header-digest responsive to the header, the computed-header-digest being compared to a header-segment-header-digest included in the header so as to verify error-free receipt of the header for the iSCSI PDU.

The apparatus preferably further includes a data-digest machine which is adapted to generate a computed-data-digest responsive to the payload, the computed-data-digest being compared to a header-segment-data-digest included in the header so as to verify error-free receipt of the payload for the iSCSI PDU.

Preferably, the analysis machine includes:

a parsing machine which is adapted to parse at least one TCP segment so as to recover the header and the at least part of the payload of the iSCSI PDU;

a header-processing machine which is adapted to evaluate the header so as to determine a disposition of the payload; and a data-processing machine which is adapted to route the at least part of the payload to the system memory for processing by the computing device responsive to the disposition, independent of recovering a remainder of the payload beyond the recovered part.

Preferably, the header-processing machine is adapted to receive and route at least one header event, and to execute header processing actions, responsive to the at least one header event.

Further preferably, the at least one header event includes at least one of a pass-PDU-data event indicative of receipt by the parsing machine of an initial part of the payload of the iSCSI PDU, a handle-PDU-header event indicative of receipt by the parsing machine of a header, and a data-digest-result event indicative of completion of a data digest calculation by the data-processing machine.

Further preferably, the header processing actions include:

identifying the at least part of the payload as an initial part of the payload for each of the iSCSI PDU;

determining a destination address in the system memory for the at least part of the payload;

recovering iSCSI information from the header; and executing iSCSI actions responsive to the iSCSI information.

Preferably, the data-processing machine is adapted to generate a computed-data-digest, and to compare the computed-data-digest to a header-segment-data-digest comprised in the header for the iSCSI PDU so as to verify error-free receipt of the payload.

Preferably, the data-processing machine is adapted to receive and route at least one data event and to execute data processing actions responsive to the at least one data event.

Preferably, the at least one data event includes at least one of a handle-initial-PDU-data event indicative of receipt of an initial part of the payload, and a handle-PDU-data event indicative of receipt of a subsequent part of the payload.

Preferably, the data processing actions include:

transferring data included in the at least part of the payload to the system memory;

determining that the at least part of the payload is an initial part of the payload for the iSCSI PDU; and acknowledging receipt of the initial part.

Further preferably, transferring the data includes:

calculating a destination address in the system memory for the data, responsive to the disposition of the payload;

moving a received-quantity-of-data from the at least part of the payload to the destination address;

determining an expected-quantity-of-data for the iSCSI PDU; and evaluating a state of completion for the iSCSI PDU responsive to a comparison of the received-quantity-of-data to the expected-quantity-of-data.

Preferably, the data processing actions include computing a data digest responsive to the payload so as to verify error-free receipt of the payload for the iSCSI PDU.

Preferably, the parsing machine is adapted to receive and route at least one parsing event and to execute parsing actions, responsive to the at least one parsing event.

Preferably, the at least one parsing event comprises at least one of receive-TCP-segment event indicative of receipt of the TCP segment, and a received-pass-PDU event indicative of acknowledgement of receipt of an initial part of payload.

Preferably, the parsing actions comprise: determining a starting header-segment boundary and an ending header-segment boundary so as to delineate the header;

recovering the header from the at least one TCP segment;

determining a starting payload boundary and an ending payload boundary so as to delineate the at least part of the payload;

conveying the header to the header-processing machine and the at least part of the payload to the data-processing machine, independent of delineating an entire payload;

identifying the at least part of the payload as an initial part of the entire payload for the iSCSI PDU; and receiving an acknowledgment of receipt of the initial part from the data-processing machine.

Preferably, the parsing machine is adapted to generate a computed-header-digest, and to compare the computed-header-digest to a header-segment-header-digest comprised in the header for the iSCSI PDU so as to verify error-free receipt of the header.

There is further provided, according to a preferred embodiment of the present invention, a method for receiving a sequence of Transmission Control Protocol (TCP) segments, including:

parsing in a parsing machine the at least one TCP segment into one or more Internet Small Computer Systems Interface Protocol Data Units (iSCSI PDUs), the parsing machine being adapted to recover a header and at least a part of a payload for the iSCSI PDU; and receiving and evaluating the header and receiving and routing the at least part of the payload for the iSCSI PDU in at least one analysis machine, so that the parsing machine and the at least one analysis machine operate substantially autonomously.

Preferably, receiving the TCP segments includes receiving TCP segments generated by at least one of an iSCSI initiator and an iSCSI target.

The method preferably includes implementing the parsing machine and the at least one analysis machine using at least two separate physical processors.

Preferably, the header is included in a plurality of incoming TCP segments.

Preferably, the payload is included in a plurality of incoming TCP segments.

The method preferably further includes generating a computed-data-digest responsive to the payload in a data-digest machine and comparing the computed-data-digest to a header-segment-data-digest comprised in the header in the at least one analysis machine so as to verify error-free receipt of the payload for the iSCSI PDU.

The method preferably further includes generating a computed-header-digest responsive to the header in a header-digest machine and comparing the computed-header-digest to a header-segment-header-digest comprised in the header in the parsing machine so as to verify error-free receipt of the header for the iSCSI PDU.

Preferably, the parsing machine is adapted to receive and route at least one parsing event and to execute parsing actions, responsive to the at least one parsing event.

Further preferably, the parsing events include at least one of a receive-TCP-segment event indicative of receipt of the TCP segment, and a received-pass-PDU event indicative of acknowledgement by the at least one analysis machine of receipt of an initial part of the payload included in the at least part of the payload.

Preferably, the parsing actions include:

determining a starting header boundary and an ending header boundary so as to delineate the header;

recovering the header from the at least one TCP segment;

determining a starting payload boundary and an ending payload boundary so as to delineate the at least part of the payload;

conveying the header and the at least part of the payload to the at least one analysis machine;

identifying the at least part of the payload as an initial part of the payload for the iSCSI PDU; and receiving an acknowledgment of receipt of the initial part of the payload from the at least one analysis machine.

Preferably, the parsing actions include verifying error-free receipt of the header by comparing a computed-header-digest generated by the parsing machine to a header-segment-header-digest included in the header for the iSCSI PDU.

Preferably, receiving and evaluating the header and receiving and routing the at least part of the payload includes:

receiving and evaluating the header in a header-processing machine; and receiving and routing the at least part of the payload in a data-processing machine, the header-processing machine and the data-processing machine operating substantially autonomously.

Preferably, the header-processing machine is adapted to receive and route at least one header event, and to execute header processing actions, responsive to the at least one header event.

Preferably, the header events include at least one of a pass-PDU-data event indicative of receipt by the parsing machine of an initial part of the payload of the iSCSI PDU, a handle-PDU-header event indicative of receipt by the parsing machine of a header, and a data-digest-result event indicative of completion of a data digest calculation by the data-processing machine.

Preferably, the header processing actions include:

identifying the at least part of the payload as an initial part of the payload for the iSCSI PDU;

determining a destination address in a system memory for the at least part of the payload;

recovering iSCSI information from the header; and executing iSCSI actions responsive to the iSCSI information.

Preferably, the header processing actions include verifying error-free receipt of the payload by comparing a computed-data-digest generated by the data-processing machine to a header-segment-data-digest included in the header.

Preferably, the data-processing machine is adapted to receive and route at least one data event and to execute data processing actions, responsive to the at least one data event.

Further preferably, the data events include at least one of a handle-initial-PDU-data event indicative of receipt of an initial part of the payload included in the at least part of the payload, and a handle-PDU-data event indicative of receipt of a subsequent part of the payload.

Preferably, the data processing actions include:

transferring data included in the at least part of the payload to a system memory;

determining that the at least part of the payload is an initial part of the payload; and acknowledging receipt of the initial part.

Preferably, transferring the data includes:

calculating a destination address in the system memory for the data;

moving a received-quantity-of-data from the at least part of the payload to the destination address;

determining an expected-quantity-of-data for the iSCSI PDU; and evaluating a state of completion for the iSCSI PDU responsive to a comparison of the received-quantity-of-data to the expected-quantity-of-data.

Preferably, the data processing actions include computing a data digest responsive to the payload so as to verify error-free receipt of the payload for the iSCSI PDU.

There is further provided, according to a preferred embodiment of the present invention, a method for processing a sequence of Transmission Control Protocol (TCP) segments that contains an Internet Small Computer Systems Interface Protocol Data Unit (iSCSI PDU), the iSCSI PDU including a header and a payload, the method including:

parsing the TCP segments so as to recover the header and at least a part of the payload of the iSCSI PDU;

evaluating the header so as to determine a disposition of the payload; and routing the at least part of the payload responsive to the disposition, independent of recovering a remainder of the payload beyond the recovered part.

Preferably, routing the at least part of the payload includes writing the payload to a memory of a computing device, for processing by the device in accordance with the header.

Further preferably, parsing the TCP segments and evaluating the header include parsing and evaluating using a network interface device that receives the TCP segments over a network, and wherein routing the at least part of the payload includes transferring the payload from the network interface device to a memory of a computing device.

The method preferably further includes implementing the parsing, recovering, receiving, and routing using at least two separate physical processors.

Preferably, the header is included in a plurality of incoming TCP segments.

Preferably, the payload is included in a plurality of incoming TCP segments.

The method preferably further includes generating a computed-header-digest responsive to the header, and comparing the computed-header-digest to a header-segment-header-digest included in the header to verify error-free receipt of the header.

The method preferably further includes generating a computed-data-digest responsive to the payload, and comparing the computed-data-digest to a header-segment-data-digest comprised in the header so as to verify error-free receipt of the payload for the iSCSI PDUs.

Preferably, parsing the TCP segment includes receiving and routing at least one parsing event and executing parsing actions, responsive to the at least one parsing event.

Preferably, the parsing events include at least one of a receive-TCP-segment event indicative of receipt of the TCP segment, and a received-pass-PDU event indicative of acknowledgement of receipt of an initial part of the payload included in the at least part of the payload.

Preferably, the parsing actions include:

determining a starting header boundary and an ending header boundary so as to delineate the header;

recovering the header from the at least one TCP segment;

determining a starting payload boundary and an ending payload boundary so as to delineate the part of the payload;

conveying the header and the at least part of the payload for additional processing, independent of delineating an entire payload;

identifying the at least part of the payload as an initial part of the entire payload; and receiving an acknowledgment of receipt of the initial part.

Preferably, receiving and evaluating the header comprises receiving and routing at least one header event, and executing header processing actions responsive to the at least one header event.

Further preferably, the header events include at least one of a pass-PDU-data event indicative of receipt of an initial part of the payload of the iSCSI PDU, a handle-PDU-header event indicative of receipt of a header, and a data-digest-result event indicative of completion of a data digest calculation.

Preferably, the header processing actions include: identifying the at least part of the payload as an initial part of the payload;

determining a disposition of the at least part of the payload by computing a destination address in a system memory for data included in the part;

recovering iSCSI information from the header-segment; and executing iSCSI actions responsive to the iSCSI information.

Preferably, receiving and routing the at least part of the payload includes receiving and routing at least one data event and executing data processing actions, responsive to the at least one data event.

Preferably, the data events include at least one of a handle-initial-PDU-data event indicative of receipt of an initial part of the payload included in the at least part of the payload, and a handle-PDU-data event indicative of receipt of a subsequent part of the payload.

Preferably, the data processing actions include:

transferring data including in the at least part of the payload to a system memory;

determining that the part of the payload is an initial part of the payload for the iSCSI PDU; and acknowledging receipt of the initial part.

Preferably, transferring the data includes:

calculating a destination address in the system memory for the data, responsive to a disposition of the payload;

moving a received-quantity-of-data from the at least part of the payload to the destination address;

determining an expected-quantity-of-data for the iSCSI PDU; and evaluating a state of completion for the iSCSI PDU responsive to a comparison of the received-quantity-of-data to the expected-quantity-of-data.

The present invention will be more fully understood from The following detailed description of the preferred embodiments thereof, taken together with the drawings, in which:

BRIEF DESCRIPTION OF THE DRAWINGS

FIG. 5 is a combined state diagram and data flow diagram that schematically shows states, processing, events, transitions, and data flow comprised in iSCSI receiver processing, according to a preferred embodiment of the present invention;

FIGS. 6A and 6B are a flow chart that schematically illustrates logic comprised in the P-machine of FIG. 5, according to a preferred embodiment of the present invention;

FIG. 8 is a flow chart that schematically illustrates logic comprised in the H-machine of FIG. 5, according to a preferred embodiment of the present invention; and FIG. 9 is a schematic block diagram depicting an allocation of iSCSI receiver processing to physical processors, according to a preferred embodiment of the present invention.

DETAILED DESCRIPTION OF PREFERRED EMBODIMENTS

Figure 1:
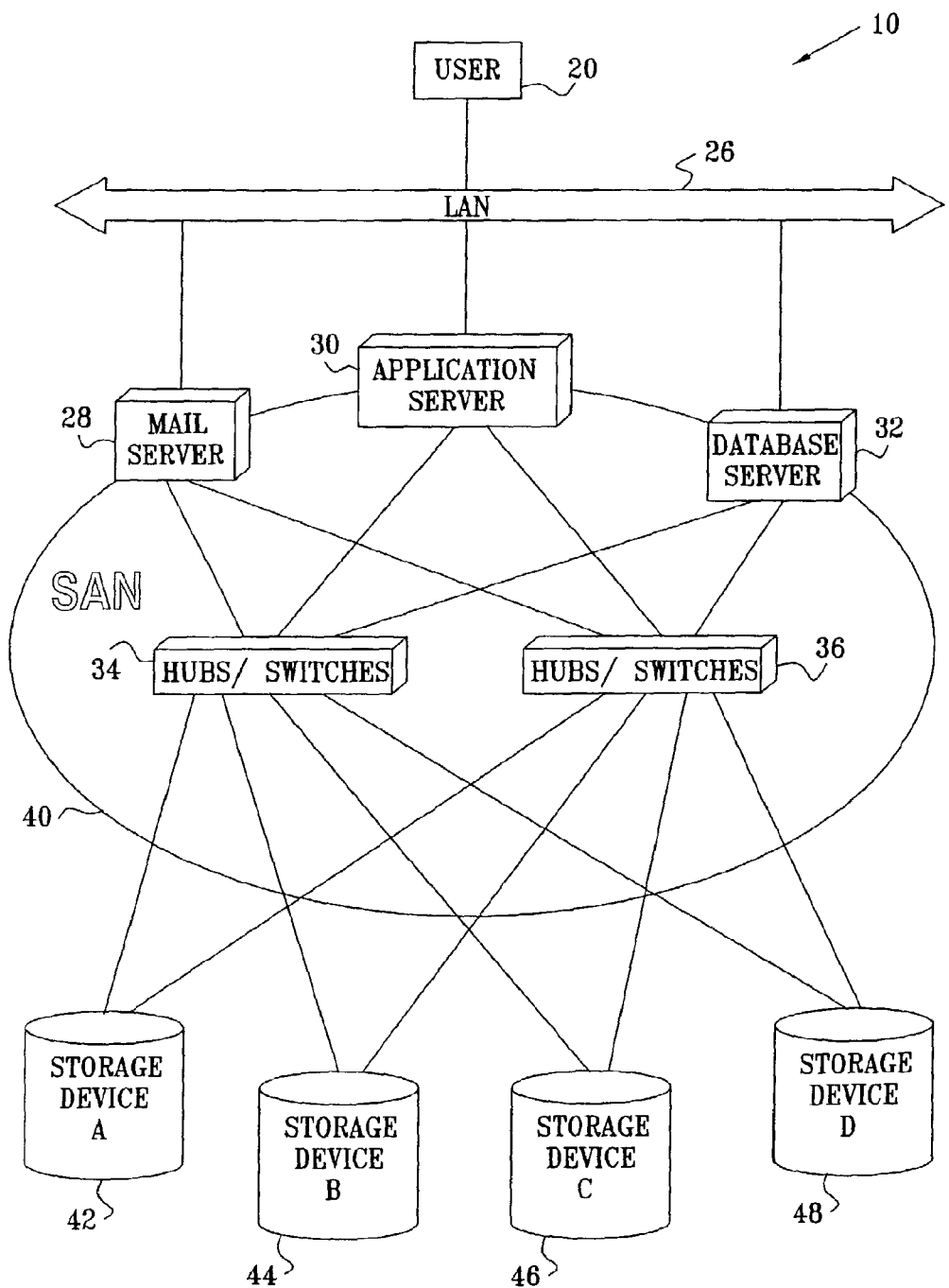
FIG. 1 is a schematic block diagram depicting an architecture for a Storage Area Network (SAN), as is known in the art.
Figure 2:
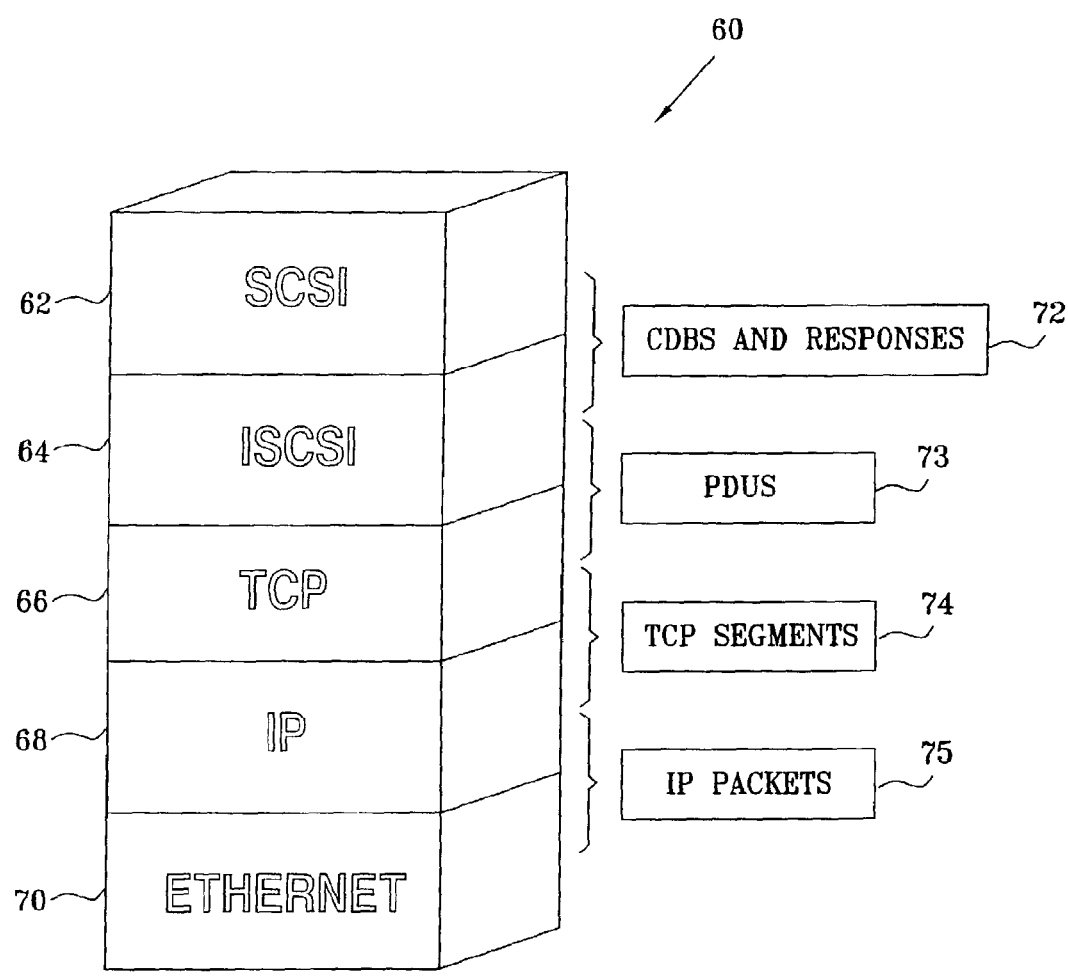
FIG. 2 is a schematic block diagram depicting a protocol stack used in an Internet Small Computer Systems Interface (iSCSI), as is known in the art.

Reference is now made to FIG. 5, which is a combined state diagram and data flow diagram that schematically shows states, processing, events, transitions, and data flow comprised in iSCSI receiver processing, according to a preferred embodiment of the present invention. iSCSI receiver processing machine 150 handles a TCP segment from its arrival at the iSCSI receiver to its routing to a destination memory, and employs an event-driven design comprising three states, with each state handled in a machine: a Protocol Data Unit (PDU) delineation state 152, a header processing state 154, and a data processing state 156.

In the context of the present patent application and the claims, the term "machine" is defined as a hardware processing unit, which may be implemented as a software-driven central processing unit (CPU) or as a hard-wired or programmable logic device, or as a combination of such elements. Multiple such "machines" may be provided on a single integrated circuit chip, each carrying out its assigned tasks substantially autonomously. Also in the context of the present patent application and the claims, the term "event" is defined as a message conveyed to a processing unit indicative of a significant activity or state change. Events typically comprise an identification indicating a type of activity or state change and additional parameters qualifying and detailing the activity or state change. Events may be implemented in hardware, e.g., via hard-wired signals, or in software, e.g., using operating system resources or shared memory, or in a combination of such methods.

Thus, three machines, a P-machine 153, an H-machine 155, and a D-machine 157, are defined to process PDU delineation state 152, header processing state 154, and data processing state 156, respectively. Machine 150 is most preferably implemented as a part of a custom device such as an application specific integrated circuit (ASIC). Alternatively, machine 150 is implemented from industry-standard devices, or as a combination of standard and custom devices.

Figure 3:
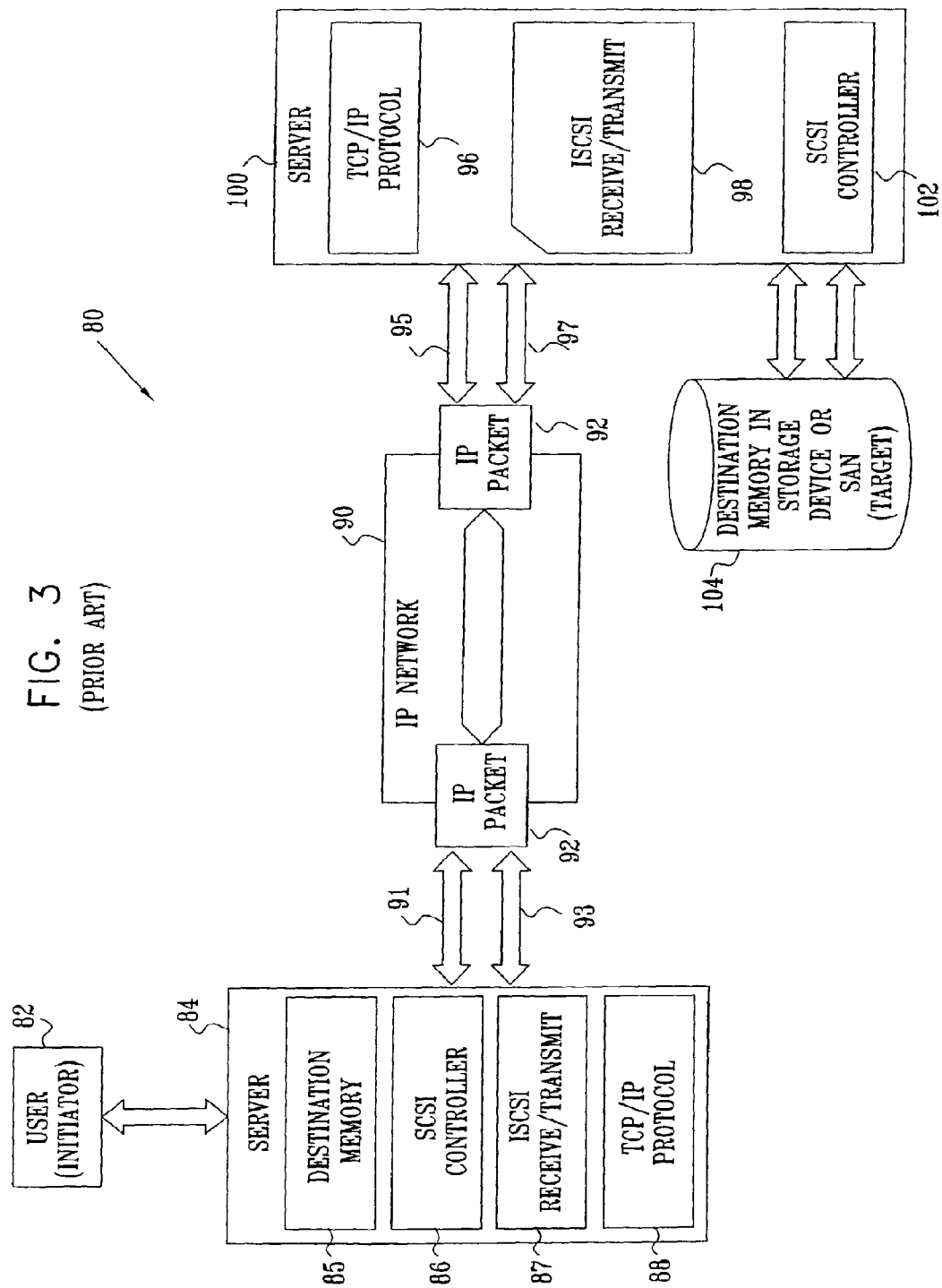
FIG. 3 is a schematic block diagram depicting a flow of SCSI transactions between an initiator and a target in an iSCSI architecture, as is known in the art.
Figure 4:
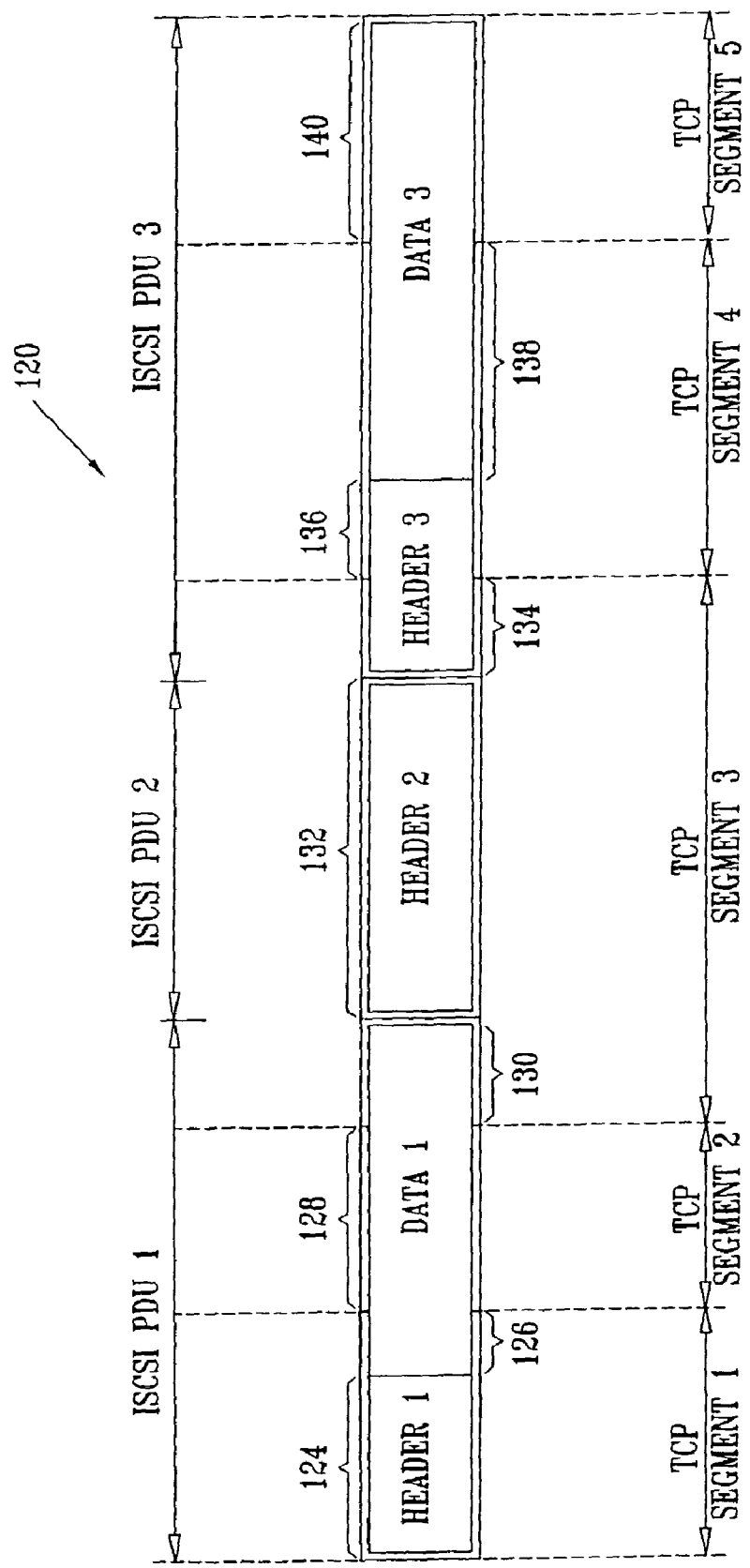
FIG. 4 is a schematic block diagram illustrating a mapping of TCP segments to iSCSI Protocol Data Units (PDUs), as is known in the art.

A parsing event Handle-TCP-segment 162, generated during a TCP session in response to arrival of a TCP segment at an iSCSI receiver from a network interface 160, initiates iSCSI receiver processing, activating P-machine 153. Network interface 160 is substantially the same as TCP/IP Protocol 88 and 96 in FIG. 3. Event Handle-TCP-segment also conveys an incoming TCP segment as data associated with the event. The P-machine delineates the incoming TCP segment into iSCSI PDU headers and optional data payload. For example, referring back to FIG. 4, the P-machine parses TCP Segment 1 to Header 1 and a partial payload consisting of a part 126 of Data 1. Delineation is performed using header length and data length fields from an iSCSI header, and information from a synchronization and steering layer in the iSCSI protocol, i.e., a marker mechanism, as described in section 2.2.9 of the IETF iSCSI Internet Draft. P-machine 153 also recovers a complete PDU header from multiple parts of headers, as required, for example, to produce header 3 from a part 134 in TCP segment 3 and a part 136 in TCP segment 4 (FIG. 4). The header and optional data payload resulting from the P-machine's parsing of the TCP segment are sent as events to H-machine 155 and D-machine 157, respectively. If digests are defined in a login phase of the session, P-machine 153 preferably directs processing of a header digest 158. A further description of the operation of P-machine 153 is given below, with reference to FIG. 6.

H-machine 155 receives a header event Handle-PDU-header 164 from P-machine 153 comprising each PDU header detected by the P-machine. The H-machine handles each Handle-PDU-header event by deciphering the contents of each respective PDU header and implementing corresponding iSCSI actions. Such actions, for example, comprise recording iSCSI command-related data such as command tags, iSCSI session tags, and task tags, handling iSCSI flow control, and routing SCSI commands to a device via a device interface 179. Device interface 179 is substantially the same as SCSI controller 86 and 102 in FIG. 3. The H-machine receives a respective header event Pass-PDU-data 166 from the P-machine comprising each data portion of an entire PDU payload. (The H-machine also interfaces to other blocks, as required for the iSCSI processing, such as interfacing with the iSCSI transmitter for sending iSCSI flow control parameters.) Each handle-PDU-header event 164 directs the H-machine to define a pointer to the beginning of the respective PDU in a destination memory 180 of server 84 or storage device 104 (FIG. 3). A further description of the operation of the H-machine is given below, with reference to FIG. 8.

The pointer to the beginning of the PDU in the destination memory is subsequently passed to D-machine 157 via a data event Handle-initial-PDU-data 170, also comprising a partial PDU payload. After the D-machine has established that a first data portion has been handled for a given PDU (by setting a first_flag to false), subsequent data portions are processed via a data event Handle-PDU-data 174, received from the P-machine. The D-machine routes PDU data 178, comprising a partial PDU payload received in the data events, to destination memory 180 via device interface 179. D-machine 157 also manages processing of a data digest 160, if digests are defined in a login phase of the session. A further description of the operation of D-machine 157 is given below, with reference to FIG. 7.

Tables I through VII below present each event shown in FIG. 5, along with principal parameters associated with each event. It is understood that Tables I through VII present principal parameters, and that additional parameters, as will be apparent to those skilled in the art, are likely to be present in preferred embodiments of the present invention.

The parameters in Tables I through VII refer to elements generated in a preferred embodiment of the present invention. It will be appreciated that the data itself, described in the tables, may be sent to the P-machine, and forwarded to the other machines. Alternatively, the data may be stored in a central location, and pointers to the data are transferred between the machines. When pointers are used, the machines access the central location to read the data.

Table I gives principal parameters and brief descriptions for Handle-TCP-segment event 162:

TABLE I

| Principal Parameters | Description |
| --- | --- |
| TCP connection number | Unique identifier (ID) for the connection |
| TCP first sequence number | The sequence number for the first byte in the TCP segment relevant to this message |
| TCP last sequence number | The sequence number for the last byte in the TCP segment relevant to this message |

Table II gives principal parameters and brief descriptions for Handle-PDU-data event 174:

TABLE II

| Principal Parameters | Description |
| --- | --- |
| PDU number | Identifying number for the PDU (internal to the implementation) |
| PDU data of the message or a pointer to its location | The data of the PDU that is relevant to this data message or a pointer to the location of this data. |
| Marker existence in range and marker offset | Boolean indicating if a marker exists in the data of this data-message and offset of the marker relative to the beginning of the data. Required to move-out the marker bytes when writing to destination memory. |
| PDU offset | Offset of the data relative to the start of the PDU. |

Table III gives principal parameters and brief descriptions for Handle-PDU-header event 164:

TABLE III

| Principal Parameters | Description |
| --- | --- |
| TCP connection number | Unique identifier (ID) for the connection. |
| iSCSI header or a pointer to its location | The iSCSI header relevant to this message or a pointer to its location. |
| PDU number | Identifying number for a PDU (internal to the implementation). |

Table IV gives principal parameters and brief descriptions for Pass-PDU-data event 166:

TABLE IV

| Principal Parameters | Description |
| --- | --- |
| PDU number | Identifying number for a PDU (internal to the implementation). |
| First_flag | Boolean - TRUE if this is the first data message sent for this message PDU. |
| PDU data of the message or | The data of the PDU that is relevant to this data message or a pointer to the |

TABLE IV-continued

| Principal Parameters | Description |
| --- | --- |
| pointer to its location | location of this data. |
| Marker existence in range and marker offset | Boolean indicating if a marker exists in the data of this data-message and offset of the marker relative to the beginning of the data. |
| PDU offset | Offset of the data relative to start of the PDU. |

Table V gives principal parameters and brief descriptions for Handle-initial-PDU-data event 170:

TABLE V

| Principal Parameters | Description |
| --- | --- |
| PDU number | Identifying number for a PDU (internal to the implementation). |
| First_flag | Boolean - TRUE if this is the first data message sent for this message PDU. |
| PDU data of the message or pointer to its location | The data of the PDU that is relevant to this data message or a pointer to the location of this data. |
| Marker existence in range and marker offset | Boolean indicating if a marker exists in the data of this data-message and offset of the marker relative to the beginning of the data. |
| PDU offset | Offset of the data relative to start of the PDU. |
| SCSI buffer offset | Offset of the data relative to start of the SCSI block this PDU belongs to. |
| Destination memory pointer | Pointer(s) to the place in the destination memory that the start of the SCSI block has to be written to, or pointer to the place in the destination memory that the start of the PDU has to be written to. |

Table VI gives a principal parameter and brief description for Received-pass-PDU event 172:

TABLE VI

| Principal Parameters | Description |
| --- | --- |
| PDU number | Identifying number for the PDU (internal to the implementation). |

Table VII gives principal parameters and brief descriptions for Data-digest-result event 168:

TABLE VII

| Principal Parameters | Description |
| --- | --- |
| PDU number | Identifying number for the PDU (internal to the implementation). |
| Data digest result | Boolean - TRUE if the computed data digest is identical to that received in the packet (result of possibly cumulative operation over more than one TCP segment). |

Figure 6B:
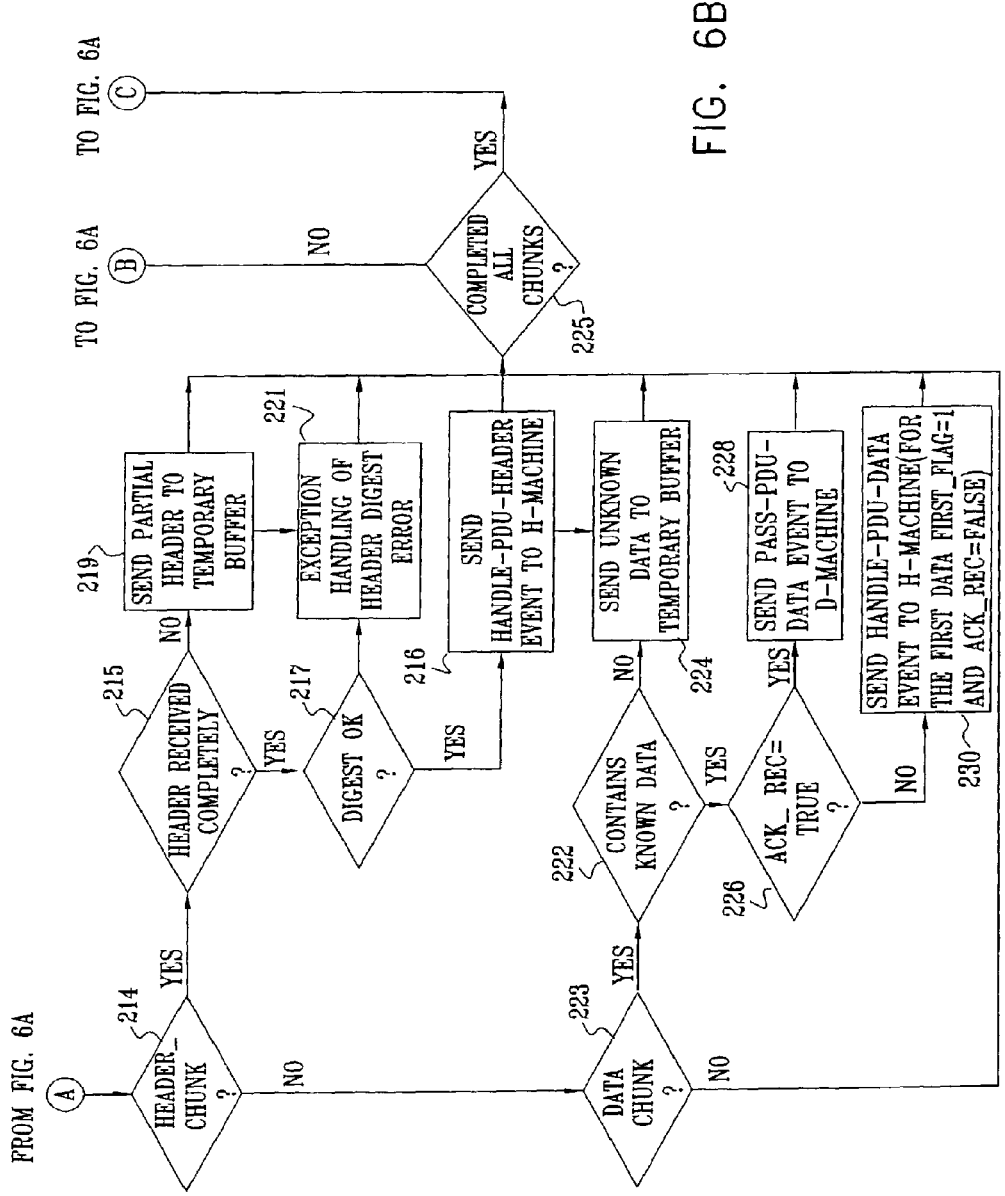

Reference is now made to FIGS. 6A and 6B, which are a flow chart that schematically illustrates logic comprised in the P-machine of FIG. 5, according to a preferred embodiment of the present invention. P-machine 153 begins in a wait-for-parsing-event step 202. A condition 204 tests it an incoming event is a handle-TCP-segment event 162 (FIG. 5). If so, a parsing step 210 delineates an incoming TCP segment into one or more complete Protocol Data Units (PDUs). Step 210 also parses the TCP segment into complete or partial headers and data sections, using data from previous segments if necessary, by methods including those described in the IETF iSCSI Internet-Draft. Header and data sections are also referred to herein as header chunks and data chunks. An example of a delineation of TCP segments into iSCSI PDUs is given above, with reference to FIG. 4.

If comparison 204 is false, the P-machine may also receive received-pass-PDU events 172, as checked in a condition 206. The received-pass-PDU event signifies that an initial portion or portions of a given PDU have been received, and that the D-machine 157 is set up to receive subsequent parts of the payload directly from the P-machine 153. The P-machine 153 indicates reception of a received-pass-PDU event 172 by setting a variable ACK_rec to true in a step 208.

A condition 214 tests if the section being handled is a header chunk. If so, a comparison 215 and a step 219 checks that the header is complete, and if not stores a partial header in a temporary buffer. In a comparison 217 and a step 221, the header digest is verified, and if the verification does not hold an error is declared. If the header is complete and the header digest verifies, a handle-PDU-header event is sent to H-machine 154 (FIG. 5) in a send event step 216.

If comparison 214 is false, a comparison 223 is performed to check if the section is a data chunk, in which case, processing continues in a condition 222 which analyzes the section to determine whether it contains a portion of data in a range for an identified PDU. If not, a send data step 224 sends the data to a temporary buffer. If the data belongs to a known range, a condition 226 checks if ACK_rec is true. If so, the P-machine 153 sends a pass-PDU-data event 228 to the D-machine 157. If ACK_rec is false, in a step 230 the P-machine 152 sends a handle-PDU-data event 174 to the D-machine 157, when first_flag (for the first data)=1.

A comparison 225 checks that all chunks have been checked. If not, the process returns to comparison 214. If all chunks have been completed, the process returns to initial step 202.

Figure 7:
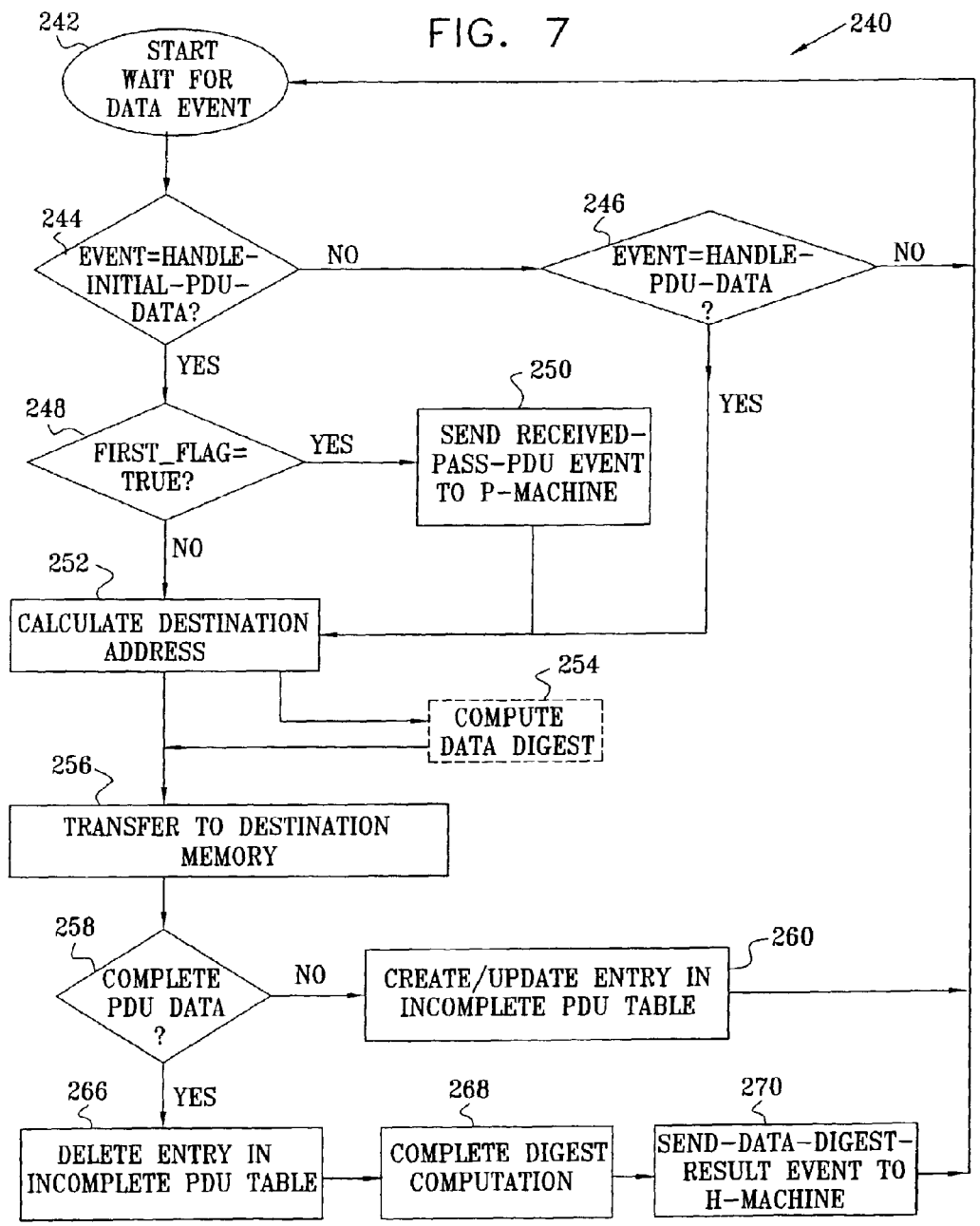
FIG. 7 is a flow chart that schematically illustrates logic comprised in the D-machine of FIG. 5, according to a preferred embodiment of the present invention.

Reference is now made to FIG. 7, which is a flow chart that schematically illustrates logic comprised in the D-machine 157 of FIG. 5, according to a preferred embodiment of the present invention. D-machine 157 begins in a wait-for-data-event step 242. A condition 244 tests if an incoming event is a handle-initial-PDU-data event 170 (FIG. 5). If so, a condition 248 queries first_flag to determine if it is the first handle-initial-PDU-data event 170 received on that PDU. If first_flag is true, the D-machine 157 sends a received-pass-PDU event 172 to the P-machine 153. Processing continues in a calculation step 252 wherein a destination address is calculated for the portion of data received with the handle-initial-PDU-data 170 or handle-PDU-data events 174. An optional compute data digest step 254 is executed, which maintains a running calculation of a data digest for one or more portions of a payload of the PDU.

A transfer step 256 accomplishes a transfer of the PDU data to the address in a destination memory computed in calculation step 252. Since data for a single PDU commonly extends over multiple TCP segments, it is necessary to keep track of incomplete PDUs. Thus, a condition 258 checks if the data in the current TCP segment completes the expected PDU data. If only partial data is present in the current TCP segment, an entry is created or updated in an incomplete PDU table in step 260. If the data in the current TCP segment completes the data expected for the given PDU, the entry in the incomplete PDU table is deleted in a deletion step 266. In a complete digest computation step 268, the data digest calculation is finished, and the result (digest OK or wrong) is sent to the H-machine in a send data-digest-result event step 270.

D-machine 157 can also receive a handle-PDU-data event 174, as determined in condition 246. The handle-PDU-data event 174 is sent to the D-machine 157 after it has acknowledged receiving a first portion of the data for the PDU, i.e., after the D-machine 157 sends a received-pass-PDU event 172. Thus, handling of the handle-PDU-data event 174 begins at calculate destination address step 252, and proceeds through steps 254, 256, 258, 260, 266, 268, and 270, substantially as described above for the handle-initial-PDU-data event 170.

Reference is now made to FIG. 8, which is a flow chart that schematically illustrates logic comprised in the H-machine 155 of FIG. 5, according to a preferred embodiment of the present invention. H-machine 155 begins in a wait-for-header-event step 282. A condition 284 tests if an incoming header event is a pass-PDU-data event 166. If so, a condition 290 tests the value of first flag. If first flag is true, i.e., the current event is among the first for the PDU, a determine pointer step 292 calculates a pointer to the start of the PDU's data in destination memory; The pointer is sent to the D-machine 157 in a send event step 294, which sends a handle-initial-PDU-data event 170 to the D-machine 157. If condition 290 determined that first flag is false, i.e., the pointer was already calculated for a prior pass-PDU-data event 166 for the current PDU, processing continues in send event 294.

H-machine 155 may also receive a handle-PDU-header event 164, as checked in condition 286. In case of this event, a process PDU header step 296 is executed. Process PDU header step 296 comprises, inter alia, identifying an embedded SCSI command, identifying an iSCSI session and task tag, and handling iSCSI flow control. The H-machine 155 most preferably also stores a data base that is relevant to the processing of iSCSI headers according to the iSCSI protocol (e.g. data to connect a PDU to the entire task). H-machine 155 may receive a data-digest-result event 168 from D-machine 157 (the D-machine 157 sends a flag to the H-machine 155 after the D-machine 157 has compared a calculated and a received digest). A condition 288 tests if a received event is a data-digest-result event 168. If the data-machine 157 indicates an error in the data digest 160, the H-machine 155 will initiate processing this error event as required in the system, according to step 298.

It will be apparent to those skilled in the art that partitioning iSCSI receiver processing as described above enables immediate handling of partial PDUs arriving in TCP segments, without waiting to assemble an entire PDU. Handling of iSCSI PDU 1 in FIG. 4 illustrates this property of preferred embodiments of the present invention. PDU 1 is transmitted in three separate TCP segments: TCP segment 1 (comprising all of header 1 and an initial part 126 of PDU data 1), TCP segment 2 (comprising a second part 128 of PDU data 1), and TCP segment 3 (comprising a final part 130 of PDU data 1). When TCP segment 1 is received by P-machine 153, header 1 is parsed in parsing step 210 (FIG. 6A) and passed to H-machine 155 in send event step 216 (FIG. 6B). Since TCP segment 1 is the first event for PDU 1, first flag is true, as set in step 230 (FIG. 6B). Thus, first part 126 of PDU 1's data is passed to the H-machine 155 in a send event step 230 (FIG. 6). The H-machine 155 processes iSCSI header 1 in process header step 296 (FIG. 8), and sends initial part 126 of PDU 1's data to D-machine 157 in send event step 294. The D-machine 157 acknowledges receipt of initial part 126 in a send event step 250 (FIG. 7), transfers the data to destination memory in transfer step 256 (FIG. 7), and creates an entry in its incomplete PDU table in step 270 (FIG. 7). Therefore, TCP segment 1 is processed completely upon receipt, despite the fact that it contains only a fragment of PDU 1.

Reference is now made to FIG. 9, which is a schematic block diagram depicting a possible allocation of iSCSI receiver processing to physical processors, according to a preferred embodiment of the present invention. A partition 320 comprises a first physical processor 322 and a second physical processor 324, also termed respectively processor A and processor B herein. Processor A and processor B are comprised in an iSCSI receive/transmit function such as iSCSI receive/transmit (FIG. 3). Processor A runs P-machine 153 and generates header digest 158. Processor B executes H-machine 155, D-machine 157, and generates data digest 160 (FIG. 5). Communication among the logical tasks comprising the iSCSI receiver implementation depicted in state diagram 150 is accomplished by methods known in the art. For example, processor A and processor B may share a common memory space (not shown in the figure) for the purposes of exchanging events. It is appreciated that a variety of implementations of physical processor schemes are possible in preferred embodiments of the present invention, including, but not limited to, allocating a single physical processor for each machine, allocating a plurality of processors for each machine, implementing data and header digest functions in specialized hardware and interfacing to the P-machine and D-machines via hardware connections, as well as other combinations of the abovementioned possibilities. The method of partitioning iSCSI receiver processing herein described enables flexibility in hardware design, effective utilization of physical processors, and efficient handling of incoming data, promoting maximal performance levels.

It will be appreciated that preferred embodiments of the present invention are able to handle both in-order and out-of-order segments by transferring TCP sequence numbers of segments with the segments, and there is no assumption that out-of-order segments have been reordered in a stage prior to the P-machine. Preferably, out-of-order segments are stored in a P-machine database until they can be fully processed. Furthermore, markers and/or other synchronization and steering layer information may be implemented so as to parse incoming segments when the segments are out-of-order segments.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, the method comprising, in a network interface device (NID):

parsing a portion of a TCP segment into one or more portions of Internet Small Computer Systems Interface (iSCSI) Protocol Data Units (PDUs);

recovering a header and a payload for one or more of said parsed iSCSI PDUs; and while said parsing continues for a remaining portion of said received TCP segment to recover a remaining portion of said iSCSI PDUs:
evaluating said recovered header; and
routing said recovered payload to a destination memory external to said network interface device for processing, wherein said evaluating and said routing occur independently of said parsing within said network interface device.

2. The method according to claim 1, comprising using respective separate physical processors for said parsing and said recovering.

3. The method according to claim 1, comprising using respective separate processors for said evaluating and said routing.

4. The method according to claim 1, comprising routing said recovered payload to a system memory external to said NID for processing.

5. The method according to claim 1, comprising routing said recovered payload to said destination memory external to said NID without intermediate buffering within said NID.

6. The method according to claim 1, comprising sharing a common memory space within said NID for said parsing and said recovering.

7. The method according to claim 6, comprising handling exchanging events for said parsing and said recovering in said single common memory space within said NID.

8. The method according to claim 1, comprising generating one or more events for handling said parsing.

9. The method according to claim 1, comprising generating one or more events for handling said recovering.

10. The method according to claim 9, wherein said generated one or more events comprises one or more of the following: a header event, a pass-PDU-data event, a handle-PDU-event and a data-digest-result event.

11. A non-transitory computer readable medium having stored thereon, a computer program having at least one code section for providing network communication, the at least one code section being executable by a computer system for causing the computer system to perform steps in a network interface device (NID), comprising:
parsing a portion of a TCP segment into one or more portions of Internet Small Computer Systems Interface (iSCSI) Protocol Data Units (PDUs);
recovering a header and a payload for one or more of said parsed iSCSI PDUs; and
while said parsing continues for a remaining portion of said TCP segment to recover a remaining portion of said iSCSI PDUs:
evaluating said recovered header; and
routing said recovered payload to a destination memory external to said network interface device for processing, wherein said evaluating and said routing occur independently of said parsing within said network interface device.

12. The non-transitory computer readable medium according to claim 11, wherein said at least one code section comprises code for controlling respective separate physical processors for said parsing and said recovering.

13. The non-transitory computer readable medium according to claim 11, wherein said at least one code section comprises code for controlling respective separate processors for said evaluating and said routing.

14. The non-transitory computer readable medium according to claim 11, wherein said at least one code section comprises code for controlling routing said recovered payload to a system memory external to said NID for processing.

15. The non-transitory computer readable medium according to claim 11, wherein said at least one code section comprises code for controlling routing said recovered payload to said destination memory external to said network interface device without intermediate buffering within said NID.

16. The non-transitory computer readable medium according to claim 11, wherein said at least one code section comprises code for controlling sharing a common memory space within said NID for said parsing and said recovering.

17. The non-transitory computer readable medium according to claim 16, wherein said at least one code section comprises code for controlling handling exchanging events for said parsing and said recovering in said single common memory space within said NID.

18. The non-transitory computer readable medium according to claim 11, wherein said at least one code section comprises code for controlling generating one or more events for handling said parsing.

19. The non-transitory computer readable medium according to claim 11, wherein said at least one code section comprises code for controlling generating one or more events for handling said recovering.

20. The non-transitory computer readable medium according to claim 19, wherein said generated one or more events comprises one or more of the following: a header event, a pass-PDU-data event, a handle-PDU-event and a data-digest-result event.

21. A system for communication, the system comprising:
a network interface device (NID) that comprises:
a first processor to enable parsing a portion of a TCP segment into one or more portions of Internet Small Computer Systems Interface (iSCSI) Protocol Data Units (PDUs); and
a second processor to enable recovering a header and a payload for one or more of said parsed iSCSI PDUs, wherein while said parsing continues for a remaining portion of said TCP segment to recover a remaining portion of said iSCSI PDUs, said second processor enables:
evaluating said recovered header; and
routing said recovered payload to a destination memory external to said network interface device for processing, wherein said evaluating and said routing occur independently of said parsing within said network interface device.

22. The system according to claim 21, wherein a third processor within said NID enables performing of said evaluating.

23. The system according to claim 22, wherein said third processor within said NID enables performing of said routing.

24. The system according to claim 21, wherein said second processor enables routing of said recovered payload to a system memory external to said NID for processing.

25. The system according to claim 21, wherein said second processor enables routing of said recovered payload to said destination memory external to said network interface device without intermediate buffering within said NID.

26. The system according to claim 21, wherein said first processor and said second processor shares a common memory space within said NID for said parsing and said recovering.

27. The system according to claim 26, wherein said first processor enables handling exchanging of events for said parsing and said recovering in said single common memory space within said NID.

28. The system according to claim 21, wherein said first processor enables generating of one or more events for handling said parsing.

29. The system according to claim 21, wherein said second processor enables generating one or more events for handling said recovering.

30. The system according to claim 29, wherein said generated one or more events comprises one or more of the following: a header event, a pass-PDU-data event, a handle-PDU-event and a data-digest-result event.

31. A system for communication, the system comprising:
a plurality of processors in a network interface device (NID), one or more of said plurality of processors being operable to:
parse a portion of a TCP segment into one or more portions of Internet Small Computer Systems Interface (iSCSI) Protocol Data Units (PDUs);
recover a header and a payload for one or more of said parsed iSCSI PDUs; and
while said parsing continues for a remaining portion of said TCP segment to recover a remaining portion of said iSCSI PDUs:
evaluate said recovered header; and
route said recovered payload to a destination memory external to said NID for processing, wherein said evaluating and said routing occur independently of said parsing within said NID.

32. The system according to claim 31, wherein a first of said plurality of processors is operable to perform said parsing and a second of said plurality of said processors performs said recovering.

33. The system according to claim 32, wherein a third of said plurality of processors is operable to perform said evaluating and a fourth of said plurality of processors is operable to perform said routing.

34. The system according to claim 31, wherein said one or more processors are operable to route said recovered payload to a system memory external to said NID for processing.

35. The system according to claim 31, wherein said one or more processors are operable to recover payload to said destination memory external to said NID without intermediate buffering within said NID.

36. The system according to claim 31, wherein a first of said plurality of processors and a second of said plurality of processors are operable to share a common memory space within said NID for said parsing and said recovering.

37. The system according to claim 36, wherein said first of said plurality of processors is operable to handle exchanging events for said parsing, and said second of said plurality of processors is operable to handle exchanging events for said recovering, utilizing said single common memory space within said NID.

38. The system according to claim 31, wherein a first one of said one or more processors is operable to generate one or more events for handling said parsing.

39. The system according to claim 31, wherein a second one of said one or more processors is operable to generate one or more events for handling said recovering.

40. The system according to claim 39, wherein said generated one or more events comprises one or more of the following: a header event, a pass-PDU-data event, a handle-PDU-event and a data-digest-result event.

* * * * *